United States Patent
Katiyar et al.

(10) Patent No.: US 11,777,922 B2
(45) Date of Patent: Oct. 3, 2023

(54) AUTONOMOUS MULTI-FACTOR AUTHENTICATION

(71) Applicant: Dell Products L.P., Round Rock, TX (US)

(72) Inventors: Shivendra Katiyar, Bangalore (IN);
Naman Goel, Bangalore (IN);
Ravishankar Kanakapura Nanjundaswamy, Bangalore (IN);
Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 17/498,961

(22) Filed: Oct. 12, 2021

(65) Prior Publication Data

US 2023/0110856 A1 Apr. 13, 2023

(51) Int. Cl.
*H04L 29/06* (2006.01)
*H04L 9/40* (2022.01)
*H04L 9/32* (2006.01)
*H04L 9/08* (2006.01)

(52) U.S. Cl.
CPC .......... *H04L 63/083* (2013.01); *H04L 9/0863* (2013.01); *H04L 9/0866* (2013.01); *H04L 9/3226* (2013.01); *H04L 9/3271* (2013.01); *H04L 2463/082* (2013.01)

(58) Field of Classification Search
CPC ... H04L 63/083; H04L 9/0863; H04L 9/0866; H04L 9/3226; H04L 9/3271; H04L 2463/082
See application file for complete search history.

(56) References Cited

U.S. PATENT DOCUMENTS

| 9,503,452 | B1* | 11/2016 | Kumar | H04L 63/0838 |
| 10,122,709 | B2* | 11/2018 | Momchilov | H04L 63/0815 |
| 2009/0292641 | A1* | 11/2009 | Weiss | H04L 9/3231 |
| | | | | 705/72 |

(Continued)

OTHER PUBLICATIONS

A. Ometov et al., "Multi-Factor Authentication: A Survey," Cryptography, vol. 2, No. 1, 2018, 31 pages.

(Continued)

*Primary Examiner* — Yogesh Paliwal
(74) *Attorney, Agent, or Firm* — Ryan, Mason & Lewis, LLP

(57) ABSTRACT

An apparatus comprises a processing device that is configured to maintain a list of a managed devices, to generate a seed value and to submit a login request to a first managed device. The processing device is configured to generate a value based at least in part on the seed value and to select a second managed device from the list based at least in part on the value. The processing device is further configured to receive a second factor authentication challenge from the first managed device and to obtain a device key encrypted passcode from the second managed device. The processing device is further configured to provide the device key encrypted passcode to the first managed device and to receive a successful authentication of the login request from the first managed device based at least in part on providing the device key encrypted passcode to the first managed device.

20 Claims, 6 Drawing Sheets

(56) References Cited

U.S. PATENT DOCUMENTS

| | | | | |
|---|---|---|---|---|
| 2013/0138961 | A1* | 5/2013 | Tsuji | H04L 9/0816 |
| | | | | 713/171 |
| 2014/0380445 | A1* | 12/2014 | Tunnell | H04L 63/18 |
| | | | | 726/7 |
| 2016/0086176 | A1* | 3/2016 | Silva Pinto | H04W 12/106 |
| | | | | 705/44 |
| 2017/0126661 | A1* | 5/2017 | Brannon | H04L 63/0815 |
| 2020/0244647 | A1* | 7/2020 | Liu | H04L 9/0894 |

OTHER PUBLICATIONS

Wikipedia, "Mulit-factor Authentication," https://en.wikipedia.org/wiki/Multi-factor_authentication, Sep. 5, 2021, 12 pages.

Averon, "Seamless MFA," https://averon.a2hosted.com/seamless-mfa/, Accessed Oct. 12, 2021, 7 pages.

M. D. Corner et al., "Zero-Interaction Authentication," Proceedings of the 8th Annual International Conference on Mobile Computing and Networking, Sep. 23-28, 2002, 11 pages.

\* cited by examiner

AUTONOMOUS MULTI-FACTOR AUTHENTICATION

FIELD

The field relates generally to computer systems, and more particularly to multi-factor authentication in computer systems.

BACKGROUND

In cloud and edge infrastructure environments, security is a primary requirement. There are multiple denial-of-service and man-in-the-middle attacks that are capable of impacting the security of such infrastructure environments. For example, hackers may utilize phishing techniques to gain access to data packets and thereby gain access to secure data such as hardware management network data or operating system (OS) management network data. In an infrastructure environment where public cloud and hybrid cloud configurations are utilized, communications between the management nodes and their corresponding cloud resources may be vulnerable to such attacks.

SUMMARY

In one embodiment, an apparatus comprises at least one processing device comprising a processor coupled to memory. The at least one processing device is configured to maintain a list of a plurality of managed devices. The list comprises a plurality of entries. Each entry corresponds to one of the managed devices of the plurality of managed devices. The at least one processing device is further configured to generate a seed value and to submit a login request to a first managed device. The at least one processing device is further configured to generate a value based at least in part on the seed value and to select a second managed device from the list based at least in part on the value. The at least one processing device is further configured to receive a second factor authentication challenge from the first managed device in response to the login request and to obtain a device key encrypted passcode from the second managed device. The at least one processing device is further configured to provide the device key encrypted passcode to the first managed device and to receive a successful authentication of the login request from the first managed device based at least in part on providing the device key encrypted passcode to the first managed device.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers and other processing devices. It is to be appreciated, however, that these and other embodiments are not restricted to the particular illustrative system and device configurations shown.

Figure 1:
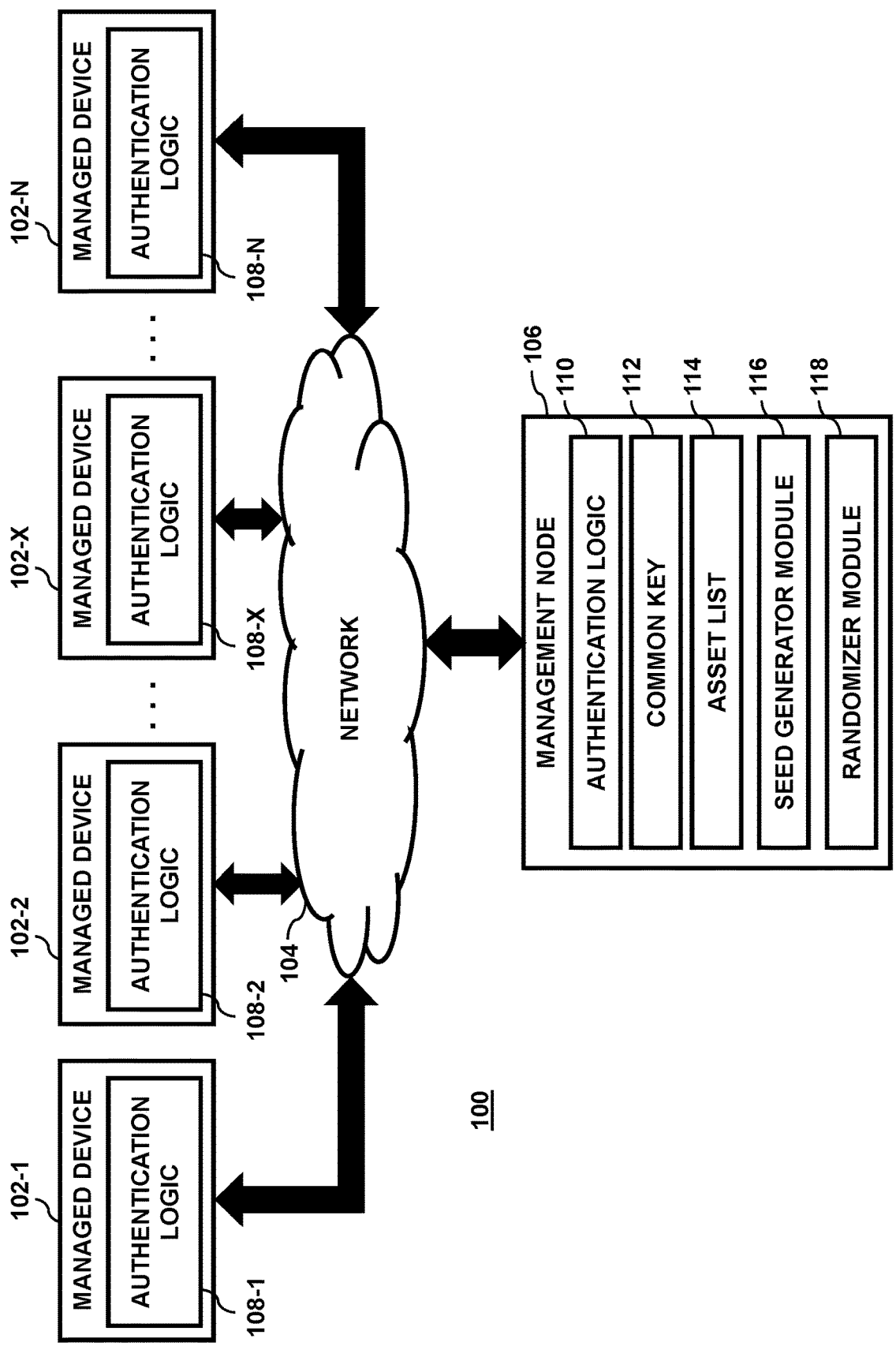
FIG. 1 is a block diagram of an example system comprising functionality for autonomous multi-factor authentication in an illustrative embodiment.

FIG. 1 shows a system 100 configured in accordance with an illustrative embodiment. The system 100 comprises managed devices 102-1, 102-2, . . . 102-X, . . . 102-N, also referred to herein collectively or individually as managed device 102. The managed devices 102 communicate over a network 104 with a management node 106.

The managed devices 102 and management node 106 illustratively comprise respective processing devices of one or more processing platforms. For example, the managed devices 102 and management node 106 can each comprise one or more processing devices each having a processor and a memory, possibly implementing virtual hosts such as, e.g., virtual machines, containers, virtual appliances, or other virtualization infrastructure, although numerous other configurations are possible.

In illustrative embodiments, the managed devices 102 comprise authentication logic 108-1, 108-2, . . . 108-X, . . . 108-N, also referred to herein collectively or individually as authentication logic 108, the function of which will be described in more detail below.

The term "user" herein is intended to be broadly construed so as to encompass numerous arrangements of human, hardware, software or firmware entities, as well as combinations of such entities.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The management node 106 comprises processing devices, memory, or other circuitry that may be utilized, for example, to manage the configurations or other aspects of the managed devices 102. While management node 106 may be described as comprising particular configurations herein, management node 106 is not limited to the disclosed embodiments and may comprise any other configuration of electrical and software components. In illustrative embodiments, management node 106 comprises authentication logic 110, a common key 112, an asset list 114, a seed generator module 116 and a randomizer module 118, the functionality of each of which will be described in more detail.

The managed devices 102 and management node 106 may be implemented on respective distinct processing platforms, although numerous other arrangements are possible. For example, in some embodiments at least portions of one or more of the managed devices 102 and management node 106 are implemented on the same processing platform. In some embodiments, management node 106 can be implemented at least in part within at least one processing platform that implements at least a portion of one or more of the managed devices 102. In some embodiments, the managed devices 102 can be implemented at least in part within at least one processing platform that implements at least a portion of management node 106.

The term "processing platform" as used herein is intended to be broadly construed so as to encompass, by way of illustration and without limitation, multiple sets of processing devices and associated computing systems that are configured to communicate over one or more networks.

Additional examples of processing platforms utilized to implement managed devices 102 or a management node 106 in illustrative embodiments will be described in more detail below in conjunction with FIGS. 5 and 6.

It is to be appreciated that these and other features of illustrative embodiments are presented by way of example only and should not be construed as limiting in any way.

Accordingly, different numbers, types and arrangements of system components such as managed devices 102, network 104 and management node 106 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments are not limited to arrangements in which the functionality described herein is implemented in a managed device or a management node, and therefore encompass various hybrid arrangements in which the functionality described herein is distributed over one or more managed devices and one or more management nodes, each comprising one or more processing devices.

Illustrative embodiments are disclosed that provide multi-factor authentication in a secure and autonomous manner through the use of an unpredictable and dynamic selection of a managed device to act as passcode broker between the management node and the target managed device that it wishes to communicate with. For example, the selection of the managed device that will act as the passcode broker may be based at least in part on a pseudo random number generated using a seed value that is tied to the given communication session for which multi-factor authentication is being sought.

Management node 106 is responsible for managing other infrastructure devices, e.g., managed devices 102, including, e.g., compute servers, network switches and storage devices. The management node 106 is configured to monitor the managed devices 102 and facilitates administrator actions for configuration changes and lifecycle management on one or more managed devices 102 in a secure manner.

Management node 106 has a copy of a common key 112, e.g., a vendor key supplied by the plugin/node provider or a common key shared out to all of the managed devices 102, which is used to secure network communications by encrypting network packets.

The management node 106 hosts a variety of services and features including, but not limited to, asset list 114, seed generator module 116 and randomizer module 118.

Asset list 114 comprises an indexed list of all managed devices 102 that are managed by the management node 106. The asset list may be updated, for example, whenever a managed device 102 is added to or removed from the set of managed devices 102 that are managed by the management node 106. The management node 106 may also be configured to push the latest version of the asset list 114 to each of the managed devices 102. In some embodiments, the management node 106 may alternatively push the latest version of the asset list 114 to one or more of the managed devices 102 which may then propagate the latest version of the asset list 114 to the remaining managed devices 102. In other embodiments, the managed devices 102 may alternatively pull the latest version of the asset list 114 from the management node 106. In some embodiments, the latest version of the asset list 114 may be pushed or pulled on a periodic schedule or in response to an event such as the addition or removal of a managed device 102 from management by the management node 106.

Asset list 114 may comprise, for example, identity information for the managed devices 102 including, e.g., IP addresses, identifier/service tags, or other information about the managed devices. In illustrative embodiments, the asset list 114 comprises a separate entry for each managed device 102.

The asset list 114 in some embodiments is implemented in the form of one or more tables or other types of data structures, and is considered an illustrative example of what is more generally referred to herein as a "list of managed devices." The term "list" as used herein is intended to be broadly construed, and should not be viewed as limited to any particular format or arrangement of entries. Other types of lists including various arrangements of managed device information can be used in other embodiments.

Seed generator module 116 utilizes a random number generation algorithm to generate a random seed value on request. The management node 106 is configured to provide the seed value to a managed device 102, e.g., as part of a communication session, for use in the multi-factor authentication process. In illustrative embodiments, the seed is encrypted by the management node 106 using the common key 112.

Randomizer module 118 utilizes a pseudo random number generator (PRNG) to generate pseudo-random numbers (PRN), e.g., integers, within the range of the asset list length. The randomizer consumes a seed generated by the seed generator module 116 as an input and generates a random value as an output. In illustrative embodiments, the random value generated by the randomizer module 118 is guaranteed to be identical if the same value of the seed is used. The PRNG may utilize a vendor defined algorithm to generate the pseudo-random number.

Managed devices 102 are infrastructure devices that are managed by the management node 106. In illustrative embodiments a managed device 102 comprises physical infrastructure although embodiments where a managed device 102 comprises virtual infrastructure are also contemplated. Managed devices 102 implement authentication logic 108 that is configured for performing autonomous multi-factor authentication.

Authentication logic 108 may comprise, for example, a baseboard management controller (BMC) for a server, a network OS for a network device, a data manager for a storage/data protection device, or functionality on any other managed device 102. Each managed device 102 comprises the common key 112 and device key 126 which may, for example, be assigned during the manufacturing process.

Authentication logic 108 comprises a service that runs on each managed device 102 and is used for the operational and lifecycle management of the managed device 102. For example, in order to make operational and lifecycle changes to the managed device 102, a user or service will need to authenticate against the authentication logic 108 of that managed device 102.

Figure 2:
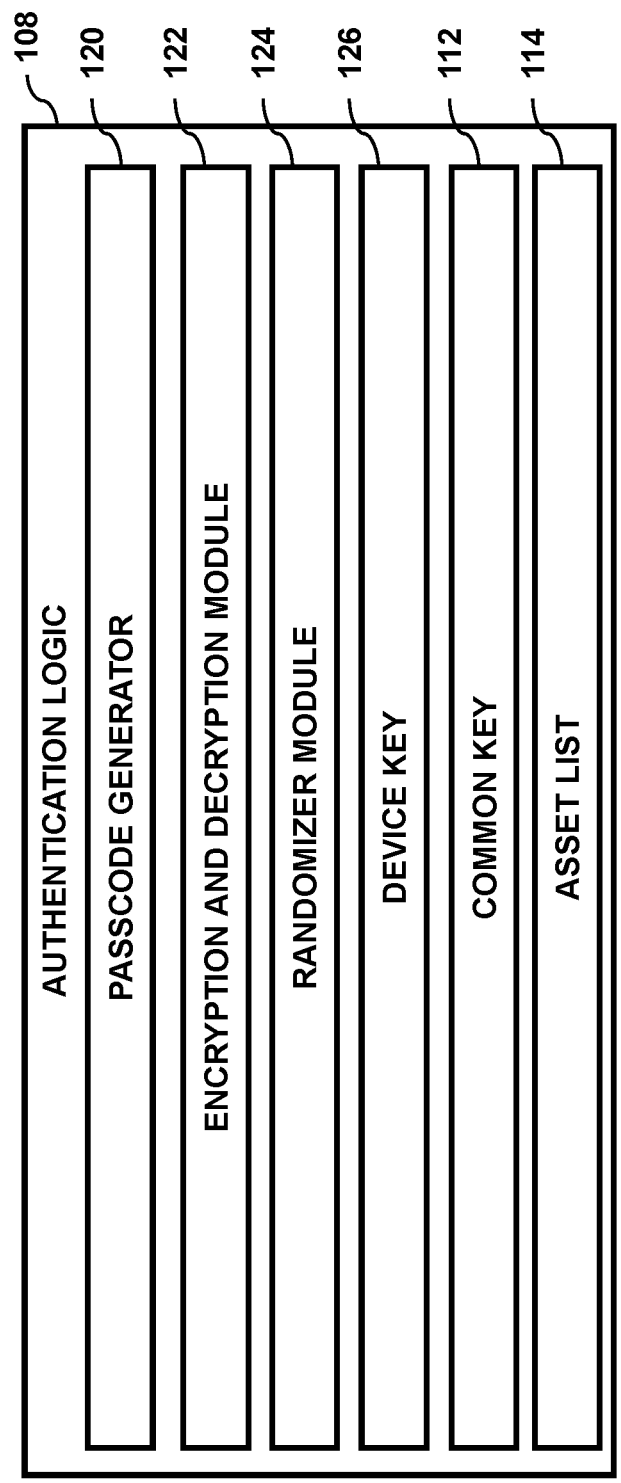
FIG. 2 is a block diagram of example authentication logic of the system of FIG. 1 in an illustrative embodiment.

With reference now to FIG. 2, in an illustrative embodiment, the authentication logic 108 hosts a variety of services and features including, but not limited to, passcode generator 120, encryption and decryption module 122, randomizer module 124, device key 126, common key 112 and asset list 114.

Passcode generator 120 generates random passcodes for one-time usage, for example, using a common passcode generator algorithm. The passcodes that are generated are of fixed length but unpredictable. The authentication logic 108 makes use of the generated passcodes during the second factor challenge process.

Encryption and decryption module 122 is responsible for encrypting and decrypting information, e.g., using standard encryption and decryption techniques such as, e.g., advanced encryption standard (AES), Rivest-Shamir-Adelman (RSA), Data Encryption Standard (DES) or other encryption techniques.

Randomizer module 124 is the same service as the randomizer module 118 of management node 106 but running on a managed device 102. Randomizer module 124 is configured to generate the same random number as the randomizer module 118 for any given seed value.

Common key 112 is a single key that is common across all or a subset of the managed devices 102. In some embodiments, for example common key 112 may comprise a vendor key that is provided to the managed devices 102. For example, the common key 112 may be assigned to a managed device 102 during the manufacturing process. In some embodiments, the common key 112 may be rotated during the lifetime of a managed device 102 using common tools for assigning new keys. The common key 112 is used to provide secure information flow between two managed devices 102. For example, where two managed devices 102 are manufactured by the same vendor, the common key 112 may comprise the vendor key for that vendor.

Device key 126 is a key that is guaranteed to be unique on each managed device 102. In some embodiments, the device key 126 may be assigned to a managed device 102 during the manufacturing process but is not shared with any other managed device 102 or the management node 106. In some cases, device keys 126 may be rotated during the lifetime of a managed device 102 using common tools for assigning new keys. The device key 126 is used for attestation control when information needs to be verified for its integrity.

In illustrative embodiments, standard session token-based authentication methods may be extended using the disclosed techniques and functionality, for example, where management node 106 and managed devices 102 will have dedicated sessions that will be established after proper identity verification and authentication.

As part of session creation process after an initial level of handshake between a managed device 102 and the management node 106, the managed device 102 will generate a session authorization code that is unique for the session and has a predefined expiration time. An example session authorization code is provided below:

```
{"token_type":"bearer",
"access_token":"GGSDRa65dGls583snIwNUNSlsj_G928GFA3kjd_LKE3dsk3KJH3s-
GjSKGjKSj52KSJ-n32j3KSJh5-DlDKGJ3DK69eKJSJ_02KJ_s3KSH39K3jdjh3Kh3kd23KJjsj",
"expires_in":3600, "scope":"devicediscovery"}
```

Figure 3:
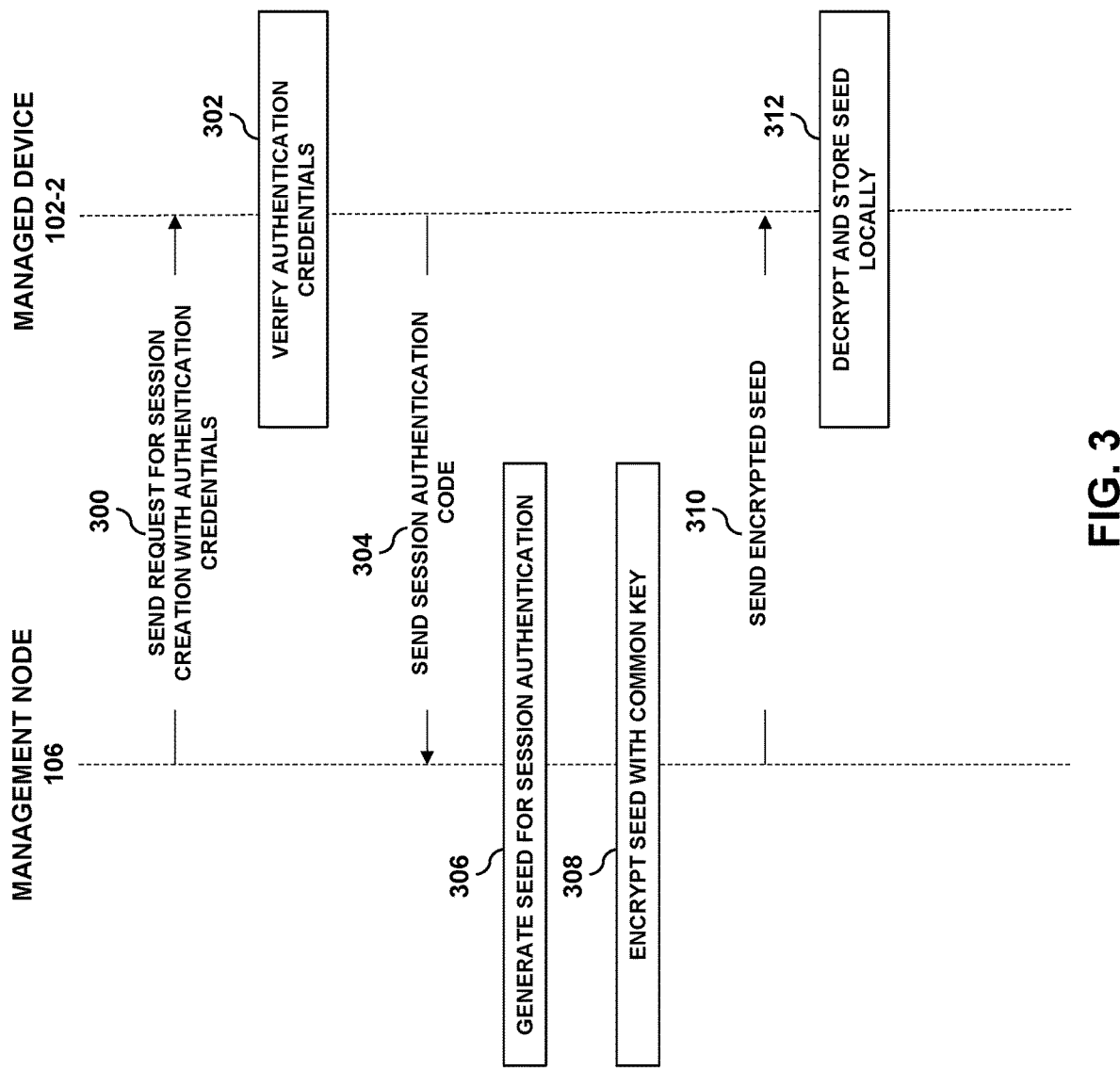
FIG. 3 is a sequence diagram illustrating a portion of an example process for autonomous multi-factor authentication in an illustrative embodiment.

FIG. 3 illustrates an example process for generating a seed for a communication session by the authentication logic 110 of the management node 106 and providing the seed to a managed device 102-2 in some embodiments. While described with reference to managed device 102-2, the process of FIG. 3 may alternatively be performed using any other managed device 102. The process as shown in FIG. 3 includes steps 300 through 312 and is suitable for use in the system 100 but is more generally applicable to other types of systems comprising multiple management nodes 106 and managed devices 102. The process is performed in part by management node 106 and managed device 102-2. The process will be described with reference also to FIGS. 1 and 2.

At step 300, management node 106 sends a request to establish a communication session to a managed device 102-2 that includes authentication credentials such as, e.g., a certificate, a username/password combination or another authentication credential. The authentication credentials may be encrypted, for example, using the common key 112.

At step 302, the authentication logic 108 of the managed device 102-2 verifies the authentication credentials. If the authentication succeeds, the authentication logic 108 sends a session authorization code to the management node 106 at step 304.

At step 306, the authentication logic 110 of the management node 106 generates a new seed using seed generator module 116. A session time and a new identifier may also be generated for the new seed. An example seed is provided below:

```
{"seed_value":"9247djd383-skr4-k3j6-s23k-
   m48473jsd438fj:
   kdj5jgk498dm5829cng48fm572d84ns9833nc
   f832nbf4", "expires_in":3600}
```

At step 308, the authentication logic 110 encrypts the seed with the common key 112.

At step 310, the authentication logic 110 sends the encrypted seed to the managed device 102-2.

At step 312, authentication logic 108 of managed device 102-2 decrypts the seed using the common key 112 and stores it locally for the time interval equivalent to session time-to-live, e.g., 3600 seconds in the example seed provided above.

In this manner a seed may be generated by the management node 106 that is specifically for use during the communication session with the particular managed device 102 that it is communicating with and provided to that managed device 102.

Figure 4:
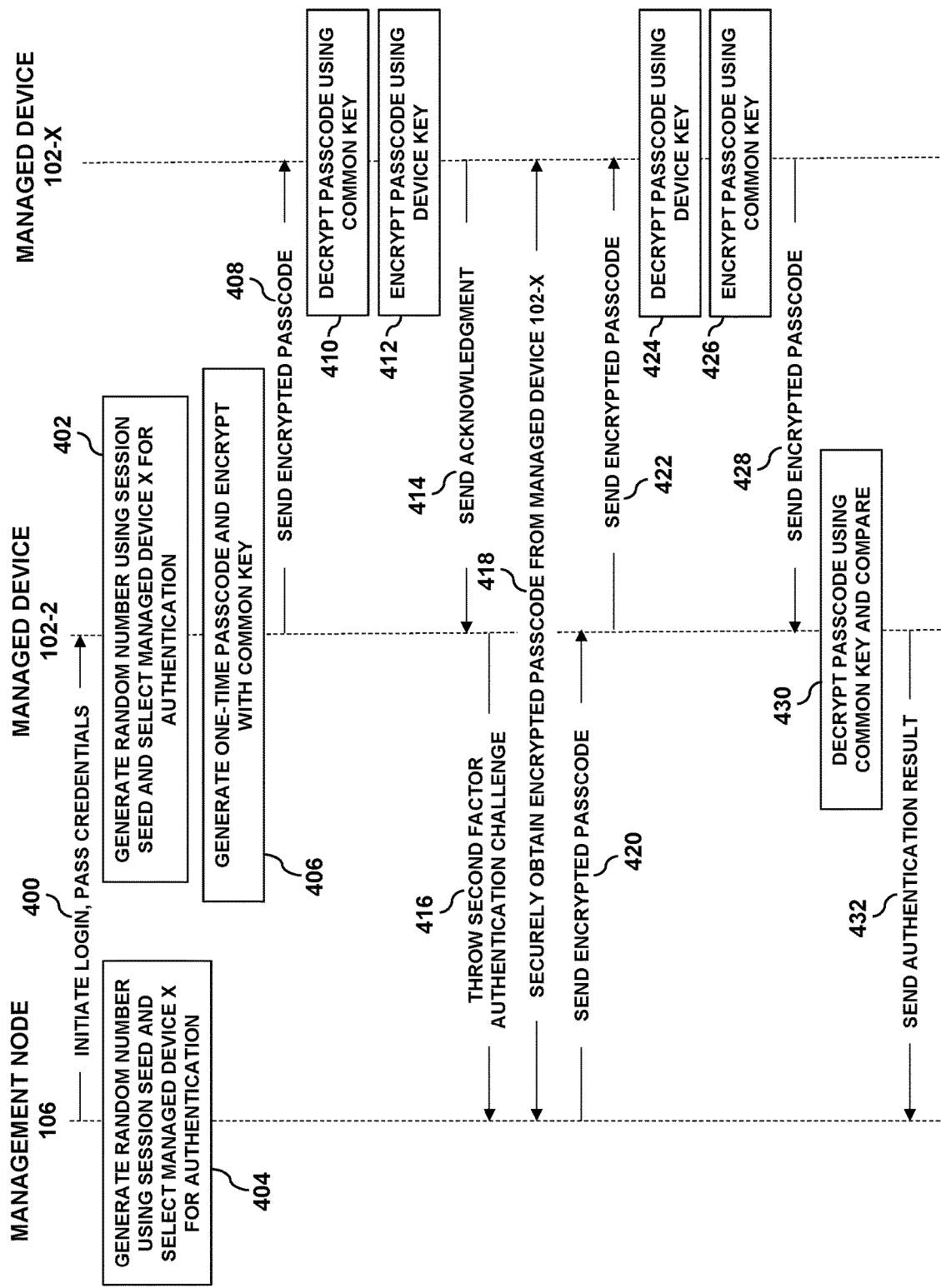
FIG. 4 is a sequence diagram illustrating another portion of an example process for autonomous multi-factor authentication in an illustrative embodiment.

FIG. 4 illustrates an example process for performing autonomous multi-layer authentication of a communication session in illustrative embodiments. The process as shown in FIG. 4 includes steps 400 through 432 and is suitable for use in the system 100 but is more generally applicable to other types of systems comprising multiple management nodes 106 and managed devices 102. The process is performed in part by management node 106, managed device 102-2 and managed device 102-X. While described with reference to managed devices 102-2 and 102-X, the process of FIG. 4 may alternatively be performed using any other managed devices 102. The process will be described with reference also to FIGS. 1 and 2. The process is performed, for example, after the process described above with reference to FIG. 3 has been performed to provide the seed to the managed device 102-2. In illustrative embodiments, the latest version of the asset list 114 has also been provided to the managed device 102-2.

At step 400, the management node 106 attempts login to the managed device 102-2 and successfully passes a first credentials-based challenge, receives the session authorization code from the managed device 102-2, generates the seed and provides the seed to the managed device 102-2, e.g., as described above for the process of FIG. 3.

At step 402, the authentication logic 108 of the managed device 102-2 uses the seed as an input to the randomizer module 124 to generate a random number.

At step 404, the authentication logic 110 of the management node 106 uses the seed as an input to the randomizer module 118 to generate the same random number. In illustrative embodiments, steps 402 and 404 may be performed serially in any order or in parallel. Both the authentication logic 108 and authentication logic 110 utilize the random number as an index into the asset list 114 to identify a managed device, e.g., managed device 102-X in this example.

At step 406, the authentication logic 108 of managed device 102-2 generates a passcode, e.g., using the passcode generator 120, and encrypts the passcode using the common key 112 to generate a first common key encrypted passcode.

At step 408, the authentication logic 108 of managed device 102-2 sends the first common key encrypted passcode to the managed device 102-X, e.g., using an application programming interface (API) call. For example, the authentication logic 108 of managed device 102-2 may use standard transport layer security and credential-based authentication to ensure that the passcode is not exposed on the network.

At step 410, the authentication logic 108 of managed device 102-X decrypts the first common key encrypted passcode using the common key 112 to generate the passcode and then encrypts the passcode again using its own device key 126 to generate a device key encrypted passcode at step 412.

At step 414, the authentication logic 108 of managed device 102-X sends an acknowledgement to managed device 102-2.

At step 416, the authentication logic 108 of managed device 102-2 receives the acknowledgment and throws a second factor authentication challenge to management node 106.

At step 418, the authentication logic 110 of the management node 106 obtains the device key encrypted passcode from managed device 102-X that was identified based on the random number generated from the seed. For example, management node 106 may utilize a secure API call to read the device key encrypted passcode from managed device 102-X, managed device 102-X may send a secure event to management node 106 that encapsulates the device key encrypted passcode, or the management node 106 may obtain the device key encrypted passcode from the managed device 102-X in any other manner. In an illustrative embodiment, multi-factor authentication is not utilized between the management node 106 and the managed device 102-X in order to inhibit the potential for cyclic dependency.

At step 420, the authentication logic 110 of the management node 106 sends the device key encrypted passcode to the managed device 102-2 as an answer to the second factor authentication challenge thrown by the managed device 102-2.

At step 422, the authentication logic 108 of managed device 102-2 sends the device key encrypted passcode to managed device 102-X, e.g., using an API call such as described above for step 408.

At step 424, the authentication logic 108 of managed device 102-X decrypts the encrypted passcode using its device key 126 ensuring its integrity.

At step 426, the authentication logic 108 of managed device 102-X encrypts the passcode using the common key 112 to generate a second common key encrypted passcode.

At step 428 the authentication logic 108 of managed device 102-X sends the second common key encrypted passcode back to managed device 102-2, e.g., using an API call such as described above for step 408.

At step 430, the authentication logic 108 of managed device 102-2 decrypts the second common key encrypted passcode using the common key 112 and then compares the decrypted passcode with the passcode generated in step 406. If the decrypted passcode matches the passcode generated in step 406, the authentication is successful, otherwise, the authentication fails.

At step 432, the authentication logic 108 of managed device 102-2 sends the authentication result to the management node 106.

It is to be understood that for any methodologies described herein with reference to the sequence diagrams of FIGS. 3 and 4, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

The authentication logic 110 of the management node 106 in conjunction with the authentication logic 108 installed on the managed devices 102 provides the functionality to authenticate a login by the management node 106 using autonomous multi-factor authentication that does not require further user intervention. For example, since the authentication between the management node 106 and a first managed device 102, e.g., device 102-2, utilizes pseudo-random number generation based on a seed value for both the management node 106 and the first managed device 102-2 to select the same second managed device 102-X to be used in the multi-factor authentication, the process may be performed autonomously between the management node, first managed device and second managed device.

In this manner the need for manual intervention in the multi-factor authentication scheme is inhibited or removed entirely which allows the multi-factor authentication to be utilized for programmable interfaces. The disclosed multi-factor authentication scheme enables programmatic multi-factor authentication for systems management and console authentication. By combining the asset list and seeding methods to determine which managed device 102 will be used as part of the multi-factor authentication scheme, the communication session between the management node 106 and the target managed device 102 may be authenticated in an enhanced manner that introduces a unique and unpredictable trust validation procedure for authentication of cloud infrastructure.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a managed device such as a managed device 102 and a management node such as management node 106 that are configured to control performance of one or more steps described herein can be implemented as part of what is more generally referred to herein as a processing platform comprising one or more processing devices each comprising a processor coupled to a memory. In the case of a managed device or management node, a given such processing device may correspond to one or more virtual machines or other types of virtualization infrastructure such as Docker containers or Linux containers (LXCs). The managed device 102 or management node 106, as well as other system components, may be implemented at least in part using processing devices of such processing platforms. For example, in a distributed implementation of the management node 106, respective distributed modules of such a backend support system can be implemented in respective containers running on respective ones of the processing devices of a processing platform.

It is to be appreciated that the particular advantages described above and elsewhere herein are associated with particular illustrative embodiments and need not be present in other embodiments. Also, the particular types of system features and functionality as illustrated in the drawings and described above are exemplary only, and numerous other arrangements may be used in other embodiments.

Illustrative embodiments of processing platforms utilized to implement managed devices or management nodes with the above-described functionality will now be described in greater detail with reference to FIGS. 5 and 6. Although described in the context of system 100, these platforms may also be used to implement at least portions of other information processing systems in other embodiments.

Figure 5:
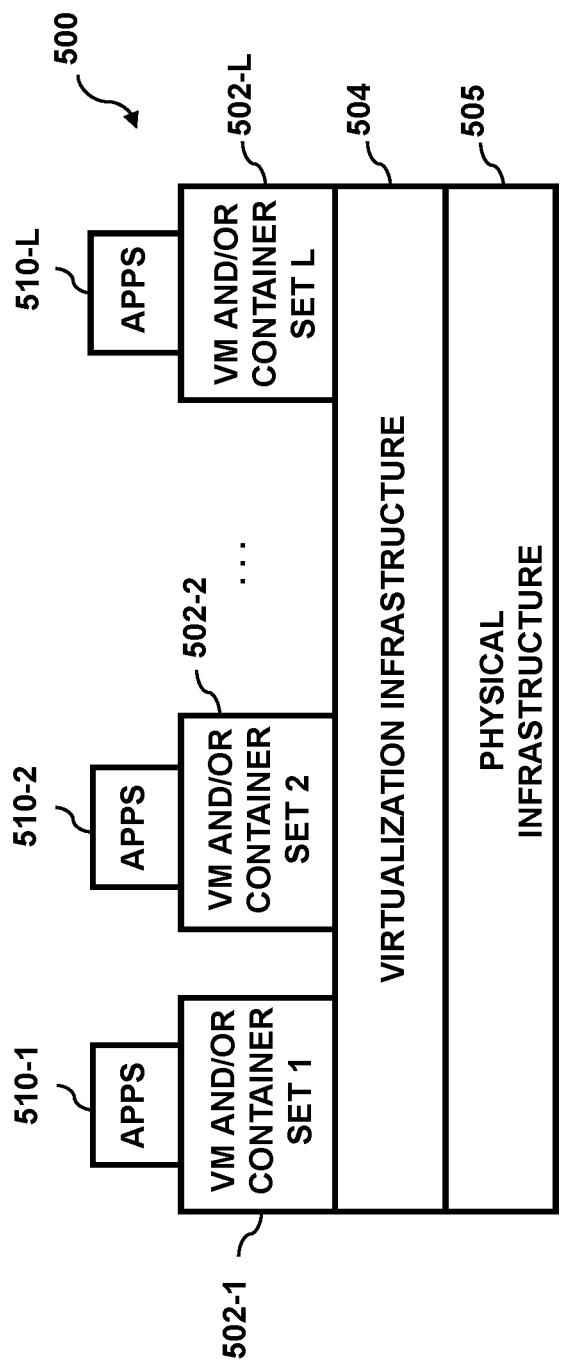
FIGS. 5 and 6 show examples of processing platforms that may be utilized to implement at least a portion of an information processing system in an illustrative embodiment.
Figure 6:
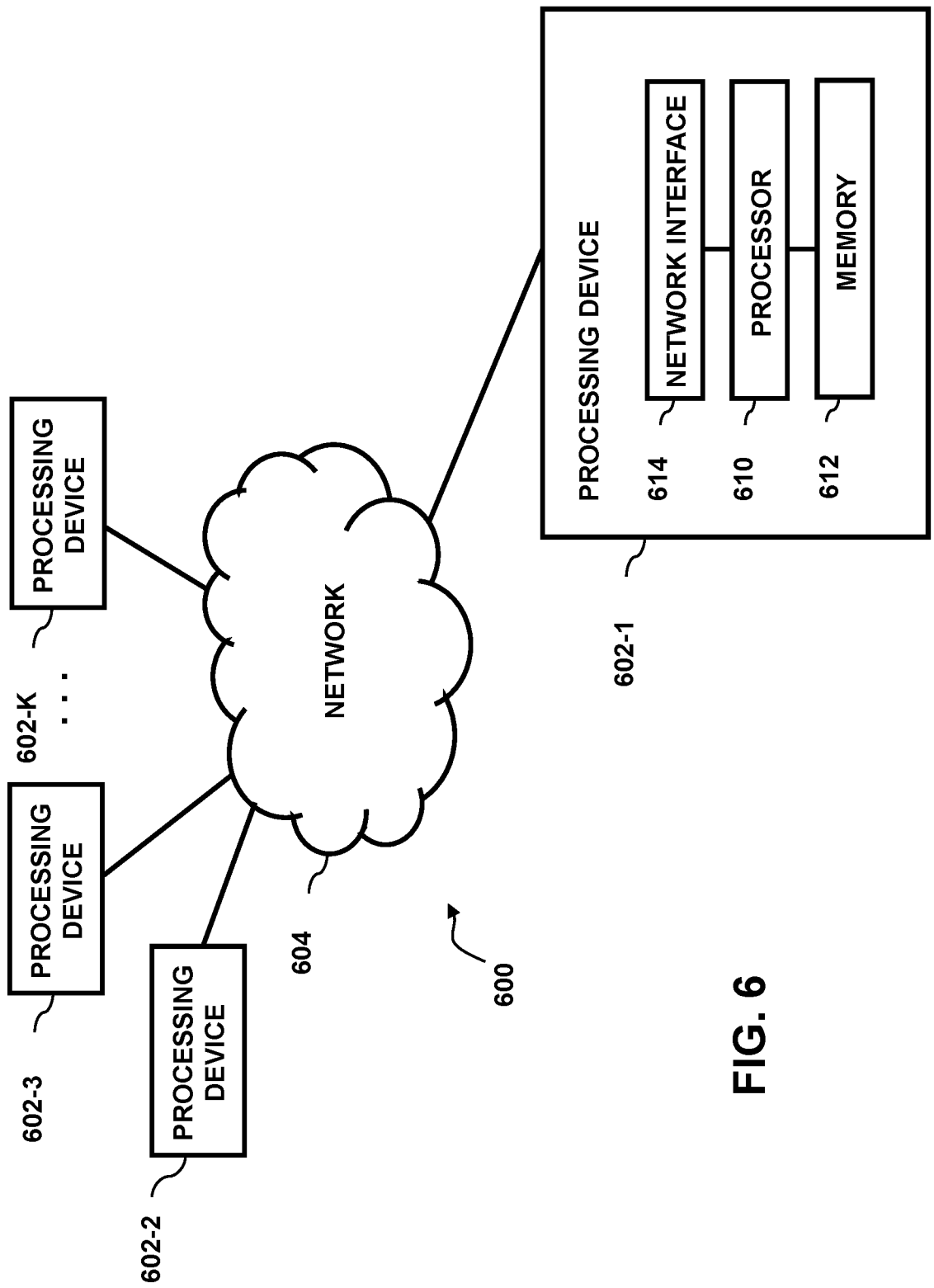

FIG. 5 shows an example processing platform comprising cloud infrastructure 500. The cloud infrastructure 500 comprises a combination of physical and virtual processing resources that may be utilized to implement at least a portion of the system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality of the type described above in the illustrative embodiments for one or more processes running on a given one of the VMs. For example, each of the VMs can implement the above-described functionality of the illustrative embodiments in the system 100.

A hypervisor platform that implements a hypervisor within the virtualization infrastructure 504 may comprise an associated virtual infrastructure management system. The underlying physical machines may comprise one or more distributed processing platforms.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality of the type described above in the illustrative embodiments. For example, a container computing device supporting multiple containers of one or more container sets can implement one or more cores executing the above-described functionality of the illustrative embodiments.

As is apparent from the above, one or more of the processing modules or other components of system 100 may each run on a computer, server or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of a system as disclosed herein can be implemented at least in part in the form of one or more software programs stored in memory and executed by a processor of a processing device. For example, at least portions of the functionality of one or more components of a system as disclosed above in the illustrative embodiments are illustratively implemented in the form of software running on one or more processing devices.

It should again be emphasized that the above-described embodiments are presented for purposes of illustration only. Many variations and other alternative embodiments may be used. For example, the disclosed techniques and functionality described above in the illustrative embodiments are applicable to a wide variety of other types of systems, computing devices, backend support systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor and a memory, the at least one processing device being configured:
   to maintain a list of a plurality of managed devices, the list comprising a plurality of entries, each entry corresponding to one of the managed devices of the plurality of managed devices;
   to generate a seed value; to submit a login request to a first managed device; to generate a value based at least in part on the seed value;
   to select a second managed device from the list based at least in part on the value;
   to receive a second factor authentication challenge from the first managed device in response to the login request;
   to obtain a device key encrypted passcode from the second managed device; to provide the device key encrypted passcode to the first managed device; and
   to receive a successful authentication of the login request from the first managed device based at least in part on providing the device key encrypted passcode to the first managed device.

2. The apparatus of claim 1 wherein the device key encrypted passcode is generated based at least in part on a device key that is unique to the second managed device.

3. The apparatus of claim 1 wherein the first managed device is configured:
   to generate a passcode based at least in part on the login request;
   to encrypt the generated passcode with a common key to generate a first common key encrypted passcode;
   to provide the first common key encrypted passcode to the second managed device;
   to provide the device key encrypted passcode received from the at least one processing device to the second managed device;
   to obtain a second common key encrypted passcode from the second managed device;
   to decrypt the second common key encrypted passcode using the common key to generate a decrypted passcode; and
   to determine that the decrypted passcode is the same as the generated passcode;
   wherein the successful authentication of the login request is received from the first managed device based at least in part on the determination by the first managed device that the decrypted passcode is the same as the generated passcode.

4. The apparatus of claim 3 wherein:
   the at least one processing device is configured:
      to provide the list to the first managed device; and
      to provide the seed value to the first managed device; and
   the first managed device is configured:
      to generate a second value based at least in part on the seed value; and
      to select the second managed device from the list based at least in part on the second value;
   wherein the first common key encrypted passcode is provided to the second managed device by the first managed device based at least in part on the selection of the second managed device by the first managed device from the list based at least in part on the second value.

5. The apparatus of claim 4 wherein:
   the at least one processing device and the first managed device each comprises a randomizer module that is configured to generate the same value given the same seed value; and
   generating the value and the second value based at least in part on the seed value by each of the at least one processing device and the first managed device comprises using the randomizer module to generate the same value.

6. The apparatus of claim 3 wherein each of the at least one processing device, the first managed device, and the second managed device has a copy of the common key.

7. The apparatus of claim 3 wherein the first managed device is configured:
to obtain an acknowledgment from the second managed device in response to providing the first common key encrypted passcode to the second managed device; and
to issue the second factor authentication challenge to the at least one processing device based at least in part on the obtained acknowledgment.

8. The apparatus of claim 3 wherein the second managed device is configured:
to decrypt the first common key encrypted passcode using the common key to generate the passcode;
to encrypt the passcode using the device key to generate the device key encrypted passcode, wherein the at least one processing device obtains the device key encrypted passcode from the second managed device based at least in part on the encryption of the passcode by the second managed device using the device key;
to decrypt the device key encrypted passcode received from the first managed device to generate a second passcode; and
to encrypt the second passcode using the common key to generate the second common key encrypted passcode, wherein the first managed device obtains the second common key encrypted passcode from the second managed device based at least in part on the encryption of the passcode by the second managed device using the device key.

9. The apparatus of claim 1 wherein selecting the second managed device from the list based at least in part on the value comprises:
identifying the entry in the list that corresponds to the value;
determining that the second managed device corresponds to the identified entry; and
selecting the second managed device from the list based at least in part on the determination that the second managed device corresponds to the identified entry.

10. A method comprising:
maintaining, by at least one processing device comprising a processor coupled to memory, a list of a plurality of managed devices, the list comprising a plurality of entries, each entry corresponding to one of the managed devices of the plurality of managed devices;
generating, by the at least one processing device, a seed value;
submitting, by the at least one processing device, a login request to a first managed device;
generating, by the at least one processing device, a value based at least in part on the seed value;
selecting, by the at least one processing device, a second managed device from the list based at least in part on the value;
receiving, by the at least one processing device, a second factor authentication challenge from the first managed device in response to the login request;
obtaining, by the at least one processing device, a device key encrypted passcode from the second managed device;
providing, by the at least one processing device, the device key encrypted passcode to the first managed device; and
receiving, by the at least one processing device, a successful authentication of the login request from the first managed device based at least in part on providing the device key encrypted passcode to the first managed device.

11. The method of claim 10 wherein the device key encrypted passcode is generated based at least in part on a device key that is unique to the second managed device.

12. The method of claim 10 wherein the method further comprises:
generating, by the first managed device, a passcode based at least in part on the login request;
encrypting, by the first managed device, the generated passcode with a common key to generate a first common key encrypted passcode;
providing, by the first managed device, the first common key encrypted passcode to the second managed device;
providing, by the first managed device, the device key encrypted passcode received from the at least one processing device to the second managed device;
obtaining, by the first managed device, a second common key encrypted passcode from the second managed device;
decrypting, by the first managed device, the second common key encrypted passcode using the common key to generate a decrypted passcode; and
determining, by the first managed device, that the decrypted passcode is the same as the generated passcode;
wherein the successful authentication of the login request is received from the first managed device based at least in part on the determination by the first managed device that the decrypted passcode is the same as the generated passcode.

13. The method of claim 12 wherein the method further comprises:
providing, by the at least one processing device, the list to the first managed device;
providing, by the at least one processing device, the seed value to the first managed device;
generating, by the first managed device, a second value based at least in part on the seed value; and
selecting, by the first managed device, the second managed device from the list based at least in part on the second value;
wherein the first common key encrypted passcode is provided to the second managed device by the first managed device based at least in part on the selection of the second managed device by the first managed device from the list based at least in part on the second value.

14. The method of claim 13 wherein:
the at least one processing device and the first managed device each comprises a randomizer module that is configured to generate the same value given the same seed value; and
generating the value and the second value based at least in part on the seed value by each of the at least one processing device and the first managed device comprises using the randomizer module to generate the same value.

15. The method of claim 12 wherein each of the at least one processing device, the first managed device, and the second managed device has a copy of the common key.

16. The method of claim 12 wherein the method further comprises:
obtaining, by the first managed device, an acknowledgment from the second managed device in response to providing the first common key encrypted passcode to the second managed device; and issuing, by the first managed device, the second factor authentication challenge to the at least one processing device based at least in part on the obtained acknowledgment.

17. The method of claim 12 wherein the method further comprises:
   decrypting, by the second managed device, the first common key encrypted passcode using the common key to generate the passcode;
   encrypting, by the second managed device, the passcode using the device key to generate the device key encrypted passcode, wherein the at least one processing device obtains the device key encrypted passcode from the second managed device based at least in part on the encryption of the passcode by the second managed device using the device key;
   decrypting, by the second managed device, the device key encrypted passcode received from the first managed device to generate a second passcode; and
   encrypt, by the second managed device, the second passcode using the common key to generate the second common key encrypted passcode, wherein the first managed device obtains the second common key encrypted passcode from the second managed device based at least in part on the encryption of the passcode by the second managed device using the device key.

18. The method of claim 10 wherein selecting the second managed device from the list based at least in part on the value comprises:
   identifying the entry in the list that corresponds to the value;
   determining that the second managed device corresponds to the identified entry; and
   selecting the second managed device from the list based at least in part on the determination that the second managed device corresponds to the identified entry.

19. A computer program product comprising a non-transitory processor-readable storage medium having stored therein program code of one or more software programs, wherein the program code when executed by at least one processing device, the at least one processing device comprising a processor coupled to memory, causes the at least one processing device:
   to maintain a list of a plurality of managed devices, the list comprising a plurality of entries, each entry corresponding to one of the managed devices of the plurality of managed devices;
   to generate a seed value;
   to submit a login request to a first managed device;
   to generate a value based at least in part on the seed value;
   to select a second managed device from the list based at least in part on the value;
   to receive a second factor authentication challenge from the first managed device in response to the login request;
   to obtain a device key encrypted passcode from the second managed device;
   to provide the device key encrypted passcode to the first managed device; and
   to receive a successful authentication of the login request from the first managed device based at least in part on providing the device key encrypted passcode to the first managed device.

20. The computer program product of claim 19 wherein:
the first managed device is configured:
   to generate a passcode based at least in part on the login request;
   to encrypt the generated passcode with a common key to generate a first common key encrypted passcode;
   to provide the first common key encrypted passcode to the second managed device;
   to provide the device key encrypted passcode received from the at least one processing device to the second managed device;
   to obtain a second common key encrypted passcode from the second managed device;
   to decrypt the second common key encrypted passcode using the common key to generate a decrypted passcode; and
   to determine that the decrypted passcode is the same as the generated passcode;
the second managed device is configured:
   to decrypt the first common key encrypted passcode using the common key to generate the passcode;
   to encrypt the passcode using the device key to generate the device key encrypted passcode, wherein the at least one processing device obtains the device key encrypted passcode from the second managed device based at least in part on the encryption of the passcode by the second managed device using the device key;
   to decrypt the device key encrypted passcode received from the first managed device to generate a second passcode; and
   to encrypt the second passcode using the common key to generate the second common key encrypted passcode;
wherein the first managed device obtains the second common key encrypted passcode from the second managed device based at least in part on the encryption of the passcode by the second managed device using the device key; and
wherein the successful authentication of the login request is received from the first managed device based at least in part on the determination by the first managed device that the decrypted passcode is the same as the generated passcode.

* * * * *